Patented Feb. 26, 1946

2,395,526

UNITED STATES PATENT OFFICE 2,395,526

ISOQUINOLINE DERIVATIVES AND METHODS OF PREPARING THE SAME

Robert B. Woodward, Cambridge, Mass., and William von Eggers Doering, New York, N. Y., assignors to Polaroid Corporation, Cambridge, Mass., a corporation of Delaware No Drawing. Application February 25, 1944, Serial No. 523,940

18 Claims. (Cl. 260—287)

This invention relates to the formation of compounds useful in the synthesis of quinine and cinchona alkaloids and, more particularly, to 7-hydroxyisoquinoline derivatives which have an atomic structure resembling the structure of homomeroquinene and from which the latter compound may be synthesized, and to methods of preparing said derivatives.

It is an object of the present invention to provide a novel method of subjecting 7-hydroxy-8-methylisoquinoline to a series of novel chemical transformations whereby the isoquinoline carbocyclic ring is suitably transformed and the bond between the 7- and 8- positions of the ring is cleaved to give the novel N-acetyl-7-oximinodihydrohomomeroquinene ethyl ester.

Another object of the present invention is to provide novel 7-hydroxy-8-methylisoquinoline derivatives and, specifically, 2-acetyl-1,2,3,4-tetrahydro-7-hydroxy-8-methylisoquinoline and the stereoisomers of 2-acetyl-7-hydroxy-8-methyldecahydroisoquinoline and of the corresponding 7-keto compounds.

According to the present invention, 7-hydroxy-8-methylisoquinoline having the formula,

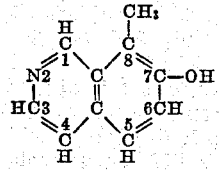

is transformed into the novel tetrahydro-derivative, 1,2,3,4 - tetrahydro-7-hydroxy - 8 - methylisoquinoline, from which the N-acetyl-derivative, 2-acetyl-1,2,3,4- tetrahydro-7-hydroxy-8-methylisoquinoline having the formula,

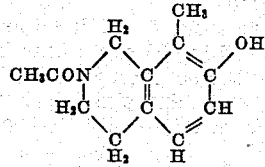

is obtained. The latter product is then converted into a mixture of stereoisomers of 2-acetyl-7-hydroxy-8-methyldecahydroisoquinoline having the formula,

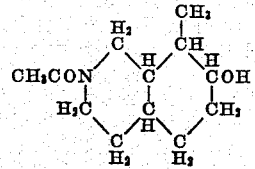

which stereoisomers may be isolated as chemical individuals and then subjected to further transformation. It is preferable, however, instead of isolating the stereoisomers from their mixture, to oxidize the latter and thus form a mixture of the corresponding ketones, i. e., the stereoisomers of 2 - acetyl-7-keto-8-methyldecahydroisoquinoline, and to isolate from the latter mixture the stereochemically homogeneous products. The desired transformation is completed by cleaving the carbocyclic ring of the individual stereoisomeric ketones to give the corresponding N-acetyl-7-oximinodihydrohomomeroquinene ethyl ester having the formula:

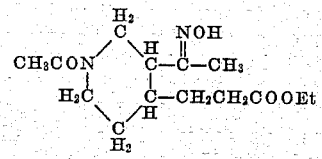

One method of preparing 7-hydroxy-8-methylisoquinoline, which is the starting material for the novel process of the present invention, is to react 7-hydroxyisoquinoline with formaldehyde, and a compound from the class consisting of primary and secondary amines, these ingredients being preferably mixed in a hydroxylic solvent, such as ethanol, methanol and water, or in a mixture of said solvents, as for example, aqueous ethanol and aqueous methanol. The formaldehyde may be obtained from any suitable source and may be conveniently introduced into the reaction mixture in aqueous solution. The primary or secondary amine may, for example, be any one of the following: piperidine, morpholine, aniline and its homologues, and the alkyl and dialkyl amines, such as methylamine, ethylamine, dimethylamine, diethylamine, methylethylamine, propylamine, dipropylamine, methylpropylamine, ethylpropylamine, ethylbutylamine, isopropylbutylamine, as well as aryl substituted derivatives of said alkyl and of said dialkyl amines. The completely aromatic secondary amines, as for example diphenylamine and the aromatic heterocyclic amines, such as indole and thiazole, are less preferred than the non-aromatic heterocyclic secondary amines, such as morpholine and piperidine and the non-cyclic amines having at least one alkyl group attached to the nitrogen, such as the alkyl and dialkyl amines.

The product of the above reaction comprises a 7-hydroxyisoquinoline derivative having an N-substituted-aminomethyl group, i. e., $$-CH_2-N\diagdown$$

attached to the eight position of the isoquinoline ring, the specific amino substituent depending on the one of the primary and secondary amines which is used as a reaction ingredient. The 7-hydroxy-8-N-substituted aminomethylisoquinoline is thereafter reduced by reacting said product with an alkali methoxide, such as sodium methoxide or potassium methoxide, preferably in a hydroxylic solvent, such as methanol. The reduction may be carried out in an autoclave and preferred temperature and time ranges therefor are between 200 and 250° C. and from six to sixteen hours. The reaction products comprise the alkali salt, e. g., the sodium or potassium salt, of 7-hydroxy-8-methylisoquinoline, and said salt is neutralized by acidification to free the 7-hydroxy-8-methylisoquinoline, the latter compound being thereafter isolated from the reaction products, preferably by sublimation and crystallization.

One method of purifying the 7-hydroxy-8-methylisoquinoline is by forming the oxalate of said compound, crystallizing said oxalate, and then liberating the pure 7-hydroxy-8-methylisoquinoline.

The 7-hydroxy-8-methylisoquinoline is thereafter hydrogenated over a suitable catalyst, as for example platinum, being thus smoothly and quantitatively converted to the tetrahydro-derivative, 1,2,3,4 - tetrahydro - 7 - hydroxy - 8 - methylisoquinoline. It is to be expressely understood that while platinum is the preferred catalyst for this purpose, other hydrogenation catalysts, such as nickel, may be employed. The tetrahydro-derivative is thereafter converted into the corresponding N-acetyl-derivative, 2-acetyl - 1,2,3,4 - tetrahydro-7-hydroxy-8-methylisoquinoline by reaction with acetic anhydride in ethanol and this N-acetyl-derivative is thereafter hydrogenated, as for example over Raney nickel, to give a practically quantitative yield of a mixture of stereoisomers of 2-acetyl-7-hydroxy - 8 - methyldecahydroisoquinoline. A certain proportion of each of the stereoisomers in this reaction mixture can be isolated as a crystalline chemical individual and when so isolated may thereafter be subjected to the following transformation in the pure form. However, it is preferable to oxidize the crude mixture of the stereoisomers to produce the corresponding stereoisomeric ketones, since this process reduces by one the number of asymmetric centers in the molecule. From the mixture of ketones thus obtained, a crystalline stereochemically homogeneous ketone may be isolated as a hydrate and there is excellent presumptive evidence that this ketone has a cis locking of the rings. It is significant that this form of stereochemical individual has the same configuration as the corresponding atoms of the quinine molecule. The stereoisomeric ketone, i. e., the one having a trans locking of the rings, may be obtained by evaporation of the liquid remaining after separation of the crystalline hydrate.

Either of the stereoisomers of 2-acetyl-7-keto-8-methyldecahydroisoquinoline obtained in the above described manner may thereafter be subjected to the next step in the process, which step consists in the cleavage of the carbocyclic ring between the 7- and 8- positions of the ring to give the N-acetyl-7-oximinodihydrohomomeroquinene ethyl ester in either stereoisomeric form. The cleavage is accomplished by reacting either of the ketones with ethyl nitrite and sodium methoxide, best results being obtained during this step of the process by excluding moisture from the reaction. To accomplish this all of the materials are preferably purified just prior to use and are handled in vessels equipped, for example, with calcium chloride tubes in order to obtain a complete exclusion of moisture. A rigid exclusion of moisture is also effected during the reaction.

The following examples are given to illustrate the several transformations whereby the novel products of the present invention are obtained, but it will be understood that the invention is not limited thereto except as indicated by the appended claims. Example 1 illustrates a method of preparing 7-hydroxy-8-methylisoquinoline from 7-hydroxyisoquinoline. Example 2 illustrates the preparation of 2-acetyl-1,2,3,4 - tetrahydro - 7 - hydroxy - 8 - methylisoquinoline from the 7-hydroxy-8-methylisoquinoline. Example 3 illustrates the preparation of the mixture of the stereoisomers of 2-acetyl-7-hydroxy-8-methyldecahydroisoquinoline and the transformation of this mixture to a mixture of the stereoisomers of the corresponding ketones. This example also serves to illustrate the method of isolating the crystalline ketone hydrate which is a stereochemically homogeneous compound and which evidence indicates has a cis locking of the rings and also serves to illustrate the dehydration of the latter compound. Example 4 illustrates the cleavage of the carbocyclic ring of the product of Example 3 whereby the N - acetyl - 7 - oximinodihydrohomomeroquinene ethyl ester is obtained.

*Example 1*

Twenty grams of 7-hydroxyisoquinoline is dissolved in 500 c. c. of boiling methanol containing 12 grams of piperidine. To the cooled solution is added 14 grams of 35% formalin solution. After standing for 2½ hours at room temperature, the solvent is blown off and the residual oil is dried in vacuo. The dried oil is taken up in 550 c. c. of absolute methanol and 130 grams of sodium methoxide is added. The solution is heated in the autoclave at 220° C. for twelve hours.

The reaction mixture is diluted with 400 c. c. of water and partially neutralized with 150 c. c. of concentrated hydrochloric acid. The solution is boiled down to 400 c. c. at which time 300 c. c. additional water is added and boiling is continued till the vapors no longer burn. The cooled solution is neutralized with hydrochloric acid and buffered with sodium bicarbonate. The precipitate of 7-hydroxy-8-methylisoquinoline is collected and dried.

The crude material is sublimed and the sublimate is dissolved in 400 c. c. of methanol. After concentrating the solution to 200 c. c. and cooling, 10.3 grams of shiny platelets, having a melting point of from 230 to 232° C., is obtained.

*Example 2*

Ten grams of 7-hydroxy-8-methylisoquinoline and 0.50 gram of platinum oxide are suspended in 100 c. c. of glacial acetic acid. After shaking for three hours with 60 lbs. of hydrogen, the theoretical quantity of hydrogen has been taken up. No additional hydrogen is taken up on shaking for a longer time. The catalyst is removed by filtration and the solvent by distillation in vacuo. The product remaining is dissolved in 100 c. c. of methanol and treated with 8.0 c. c. of acetic anhydride. A first crop of 11.4 grams of pure 2-acetyl-1,2,3,4-tetrahydro-7-hydroxy - 8 - methylisoquinoline, M. P. 187–198°, is obtained. A second crop of .9 gram is obtained on concentrating the mother liquor. The total yield is 94.5% of the theoretical.

*Example 3*

Four grams of 2-acetyl-1,2,3,4-tetrahydro-7-hydroxy-8-methylisoquinoline and 3 grams of Raney nickel catalyst is suspended in 20 c. c. of absolute ethyl alcohol and hydrogenated at a starting pressure of 3000 lbs. for ten hours at 150° C.

On cooling the solution is washed from the vessel and filtered. Evaporation to dry gives an oil which is a mixture of the stereoisomers of 2-acetyl-7-hydroxy-8-methyldecahydroisoquinoline.

The oil is dissolved in 40 c. c. of glacial acetic acid and cooled to −5° C. To the solution is added a solution of 1.50 grams of chromic anhydride in 5 c. c. of water and 20 c. c. of acetic acid also cooled to −5°. A dark brown precipitate appears which dissolves slowly at the ice bath temperature after three hours. The reaction mixture is then allowed to stand at room temperature for six hours and then heated at 50° C. for three more.

The acetic acid is removed in vacuo. The residual oil is shaken vigorously with 100 c. c. of ether. The chromic salt precipitate and the ether solution is decanted. The chromic salts are then dissolved in 10 c. c. of methyl alcohol; to the solution 200 c. c. of ether is added with vigorous shaking. The supernatant solution is united with the first ether extraction.

Evaporation of solvent leaves an oil containing small amounts of chromic salts. The oil is distilled in a modified Hickmann still. 2.50 grams of colorless oil is obtained. It is analytically pure 2-acetyl-7-keto-8-methyldecahydroisoquinoline. It is dissolved in an equal volume of ether. 0.20 gram of water is added with shaking. On seeding with the crystalline ketone-hydrate, 1.00 gram of pure ketone-hydrate, M. P. 82°, is obtained. The mother liquor containing other stereoisomers is saved. The ketone-hydrate is boiled with benzene until no more water is driven off and then the benzene is completely evaporated to give the anhydrous ketone.

*Example 4*

3.75 grams of 2-acetyl-7-keto-8-methyldecahydroisoquinoline hydrate, obtained in accordance with the process of Example 3, is dehydrated by boiling with benzene. The freshly obtained anhydrous ketone whose dryness is thus assured is then dissolved in a small amount of absolute alcohol, which is freshly distilled, for example, from magnesium ethoxide, in order to be completely dry.

3.84 grams of metallic sodium is also dissolved in dry absolute alcohol and then mixed with the solution of the ketone. The mixture is cooled to 0° C. and there is added to the mixture 1.24 grams of ethyl nitrite, which is preferably freshly prepared and freshly distilled after being dried over potassium hydroxide. The reaction mixture is then allowed to stand in a cold room, for example at a temperature of 5° C., with precautions taken to exclude moisture. There may be added to the mixture at predetermined intervals small quantities of freshly prepared ethyl nitrite to replace any ethyl nitrite which may be lost by evaporation.

After the mixture has stood for eighteen hours, carbon dioxide is passed in for approximately three hours, the precipitate is filtered off, and the solution is decolorized by treatment with charcoal. The solution is then evaporated to dryness, ether is added, and the mixture is again evaporated to dryness. The dry residue is dissolved in 10 c. c. of ether and 2.62 grams of crystalline N-acetyl-7-oximinodihydrohomomeroquinene ethyl ester separated from the liquid. From the mother liquor a further group of crystals is obtained. The crystals have a melting point of 94 to 96° C. and can be recrystallized from ether.

Since certain changes in carrying out the above methods and in obtaining the various species of the invention may be made without departing from the scope thereof, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. As a new composition, 2-acetyl-1,2,3,4-tetrahydro-7-hydroxy-8-methylisoquinoline.

2. As a new composition, a stereoisomer of 2-acetyl-7-hydroxy-8-methyldecahydroisoquinoline.

3. As a new composition, a stereoisomer of 2-acetyl-7-keto-8-methyldecahydroisoquinoline.

4. As a new composition, the 2-acetyl-7-keto-8-methyldecahydroisoquinoline whose hydrate has a melting point of approximately 82° C.

5. As a new composition, an N-acetyl-7-oximinodihydrohomomeroquinene ethyl ester.

6. As a new composition, the N-acetyl-7-oximinodihydrohomomeroquinene ethyl ester whose crystals have a melting point of approximately 94 to 96° C.

7. In a process for producing 1,2,3,4-tetrahydro-7-hydroxy-8-methylisoquinoline, the step which comprises hydrogenating 7-hydroxy-8-methylisoquinoline in the presence of a hydrogenation catalyst.

8. In a process for producing 1,2,3,4-tetrahydro-7-hydroxy-8-methylisoquinoline, the step which comprises hydrogenating 7-hydroxy-8-methylisoquinoline in the presence of a platinum catalyst.

9. In a process for obtaining a product comprising the stereoisomers of 2-acetyl-7-hydroxy-8-methyldecahydroisoquinoline, the steps which comprise reacting 1,2,3,4-tetrahydro-7-hydroxy-8-methylisoquinoline with acetic anhydride in ethanol, and hydrogenating the product of said reaction in the presence of a hydrogenation catalyst.

10. In a process for obtaining a product comprising the stereoisomers of 2-acetyl-7-hydroxy-8-methyldecahydroisoquinoline, the steps which comprise reacting 1,2,3,4-terahydro-7-hydroxy-8-methylisoquinoline with acetic anhydride in ethanol, and hydrogenating the product of said reaction in the presence of Raney nickel.

11. The process which comprises oxidizing a mixture of the stereoisomers of 2-acetyl-7-hydroxy-8-methyldecahydroisoquinoline, and isolating from the product of said oxidation the crystalline hydrate 2-acetyl-7-keto-8-methyldecahydroisoquinoline having a melting point of 82° C.

12. The process which comprises oxidizing a mixture of the stereoisomers of 2-acetyl-7-hydroxy-8-methyldecahydroisoquinoline, and isolating from the product of said oxidation a stereoisomer of 2-acetyl-7-keto-8-methyldecahydroisoquinoline.

13. The process which comprises oxidizing a mixture of the stereoisomers of 2-acetyl-7-hydroxy-8-methyldecahydroisoquinoline, isolating from the product of said oxidation a stereoisomer of 2-acetyl-7-keto-8-methyldecahydroisoquinoline, and reacting said stereoisomer with ethyl nitrite and sodium methoxide to obtain the corresponding-N-acetyl-7-oximinodihydrohomomeroquinene ethyl ester.

14. The process which comprises oxidizing a mixture of the stereoisomers of 2-acetyl-7-hydroxy-8-methyldecahydroisoquinoline, isolating from the product of said oxidation the crystalline hydrate of 2-acetyl-7-keto-8-methyldecahydroisoquinoline having a melting point of 82° C., dehydrating said hydrate, and reacting the anhydrous product with ethyl nitrite and sodium methoxide to obtain the corresponding N-acetyl-7-oximinodihydrohomomeroquinene ethyl ester.

15. The process which comprises hydrogenating 7-hydroxy-8-methylisoquinoline to convert said compound to 1,2,3,4 - tetrahydro - 7 - hydroxy-8-methylisoquinoline, reacting the latter compound with acetic anhydride in ethanol, hydrogenating the product of said reaction to obtain a mixture comprising the stereoisomers of 2-acetyl - 7-hydroxy - 8 - methyldecahydroisoquinoline, oxidizing said mixture, isolating from the product of said oxidation a stereoisomer of 2-acetyl - 7 - keto - 8-methyldecahydroisoquinoline, and reacting said stereoisomer with ethyl nitrite and sodium methoxide to obtain the corresponding N-acetyl-7-oximinodihydrohomomeroquinene ethyl ester.

16. The process which comprises hydrogenating 7-hydroxy-8-methylisoquinoline in the presence of platinum to convert said compound to 1,2,3,4-tetrahydro-7-hydroxy-8-methylisoquinoline, reacting the latter compound with acetic anhydride in ethanol, hydrogenating the product of said reaction over Raney nickel to obtain a mixture comprising the stereoisomers of 2-acetyl-7-hydroxy-8-methyldecahydroisoquinoline, oxidizing said mixture, isolating from the product of said oxidation a stereoisomer of 2-acetyl-7-keto-8-methyldecahydroisoquinoline, and reacting said stereoisomer with ethyl nitrite and sodium methoxide to obtain the corresponding N-acetyl-7-oximinodihydrohomomeroquinene ethyl ester.

17. The process which comprises hydrogenating 7-hydroxy-8-methylisoquinoline to convert said compound to 1,2,3,4 - tetrahydro - 7 - hydroxy-8-methylisoquinoline, reacting the latter compound with acetic anhydride in ethanol, hydrogenating the product of said reaction to obtain a mixture comprising the stereoisomers of 2-acetyl-7-hydroxy-8-methyldecahydroisoquinoline, oxidizing said mixture, isolating from the product of said oxidation the crystalline hydrate 2 - acetyl-7-keto-8-methyldecahydroisoquinoline having a melting point of 82° C., dehydrating said hydrate, and reacting the anhydrous product with ethyl nitrite and sodium methoxide to obtain the corresponding N-acetyl-7-oximinodihydrohomomeroquinene ethyl ester.

18. The process which comprises hydrogenating 7-hydroxy-8-methylisoquinoline in the presence of platinum to convert said compound to 1,2,3,4 - tetrahydro - 7 - hydroxy - 8 - methylisoquinoline, reacting the latter compound with acetic anhydride in ethanol, hydrogenating the product of said reaction over Raney nickel to obtain a mixture comprising the stereoisomers of 2-acetyl-7-hydroxy-8-methyldecahydroisoquinoline, oxidizing said mixture, isolating from the product of said oxidation the crystalline hydrate of 2-acetyl-7-keto-8-methyldecahydroisoquinoline having a melting point of 82° C., dehydrating said hydrate, and reacting the anhydrous product with ethyl nitrite and sodium methoxide to obtain the corresponding N-acetyl-7-oximinodihydrohomomeroquinene ethyl ester.

ROBERT B. WOODWARD.
WILLIAM von EGGERS DOERING.